US010999750B2

(12) United States Patent
Mirza et al.

(10) Patent No.: US 10,999,750 B2
(45) Date of Patent: May 4, 2021

(54) EARLY GX/RX SESSION FAILURE DETECTION AND RESPONSE

(71) Applicant: T-Mobile USA, Inc., Bellevue, WA (US)

(72) Inventors: Khurram Ahmad Mirza, Bellevue, WA (US); Shujaur Mufti, Snoqualmie, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/408,284

(22) Filed: May 9, 2019

(65) Prior Publication Data
US 2020/0359239 A1 Nov. 12, 2020

(51) Int. Cl.
*H04W 24/04* (2009.01)
*H04L 29/06* (2006.01)
*H04W 88/14* (2009.01)
*H04W 88/16* (2009.01)
*H04W 92/24* (2009.01)

(52) U.S. Cl.
CPC ......... *H04W 24/04* (2013.01); *H04L 65/1016* (2013.01); *H04W 88/14* (2013.01); *H04W 88/16* (2013.01); *H04W 92/24* (2013.01)

(58) Field of Classification Search
None
See application file for complete search history.

(56) References Cited

U.S. PATENT DOCUMENTS

| | | | |
|---|---|---|---|
| 9,013,979 B2* | 4/2015 | Lopez Nieto | H04L 12/1403 370/221 |
| 2013/0339783 A1* | 12/2013 | Fernandez Alonso | H04L 41/0668 714/4.11 |

(Continued)

FOREIGN PATENT DOCUMENTS

WO  WO2018171107 A1  9/2018

OTHER PUBLICATIONS

3GPP, "3rd Generation Partnership Project; Technical Specification Group Core Network and Terminals; Study on PCRF failure and restoration (Release 10)", 3GPP Standard ; Technical Report ; 3GPP TR 29.816, 3RD Generation Partnership Project (3GPP), vol. CT WG3, No. VI0.0.0, Oct. 1, 2010, 63 pages.

(Continued)

*Primary Examiner* — Otis L Thompson, Jr.
(74) *Attorney, Agent, or Firm* — Lee & Hayes, P.C.

(57) ABSTRACT

A network gateway can prevent a new communication session for a user equipment (UE) from failing by establishing Diameter Gx session binding with a backup Policy Control Function (PCF) when a Gx session cannot be established between the gateway and a primary PCF. The gateway and the primary PCF may be associated with the same network generation (such as LTE or 5G), and the backup PCF can be associated with a different network generation. An IP Multimedia Subsystem (IMS) can determine that Gx binding information about the UE is not available at the primary PCF. However, to prevent failure of the new communication session for the UE, the IMS can cause the backup PCF to use its Gx binding information to identify the Gx session established with the network gateway for the UE and provide the network gateway with rules for the new communication session.

14 Claims, 9 Drawing Sheets

(56) References Cited

U.S. PATENT DOCUMENTS

| | | | |
|---|---|---|---|
| 2015/0271275 A1* | 9/2015 | He | H04L 12/1407 |
| | | | 709/228 |
| 2016/0191631 A1* | 6/2016 | Haraszti | H04L 67/14 |
| | | | 709/227 |
| 2017/0142773 A1* | 5/2017 | Nair | H04W 76/18 |
| 2018/0167424 A1* | 6/2018 | Nair | H04M 15/856 |
| 2018/0241615 A1* | 8/2018 | Livanos | H04M 15/00 |
| 2019/0028957 A1* | 1/2019 | Hashimoto | H04W 76/15 |
| 2019/0166086 A1* | 5/2019 | Mirza | H04W 24/02 |
| 2019/0387428 A1* | 12/2019 | Ahmad | H04L 69/08 |
| 2020/0044879 A1* | 2/2020 | Mirza | H04M 15/57 |
| 2020/0068449 A1* | 2/2020 | Jin | H04W 36/0022 |

OTHER PUBLICATIONS

European Search Report and Written Opinion dated Sep. 28, 2020 for European Patent Application No. 20173049.6, 11 pages.

* cited by examiner

EARLY GX/RX SESSION FAILURE DETECTION AND RESPONSE

BACKGROUND

In a telecommunication network, Diameter protocol interfaces can link a Policy Control Function (PCF), such as a Policy and Charging Rules Function (PCRF), with gateways of a core network as well as with elements of an IP Multimedia Subsystem (IMS). For example, a PCRF can be linked over a Diameter Gx interface with a Packet Data Network Gateway (P-GW) of a Long Term Evolution (LTE) core network, and also be linked over a Diameter Rx interface with a Proxy Call Session Control Function (P-CSCF) of an IMS.

When user equipment (UE), such as a mobile phone, attaches to a telecommunication network's core network, a gateway in the core network that is associated with the UE can establish a Gx session with a PCF. The PCF can store Gx binding information that associates the UE and the gateway with the established Gx session.

When a UE initiates a communication session, such as a session for a Voice over LTE (VoLTE) call, the UE can send a Session Initiation Protocol (SIP) message to the P-CSCF of the IMS. The P-CSCF can use an Rx session to inform the PCF about the communication session for the UE, and the PCF can accordingly use its Gx binding information to identify which gateway is associated with the UE and find a corresponding Gx session previously established with that gateway. The PCF can then use that Gx session to provide the gateway with Policy and Charging Control (PCC) rules that define how the gateway should treat data for that communication session, for instance by identifying a Quality of Service (QoS) or priority level associated with the communication session.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
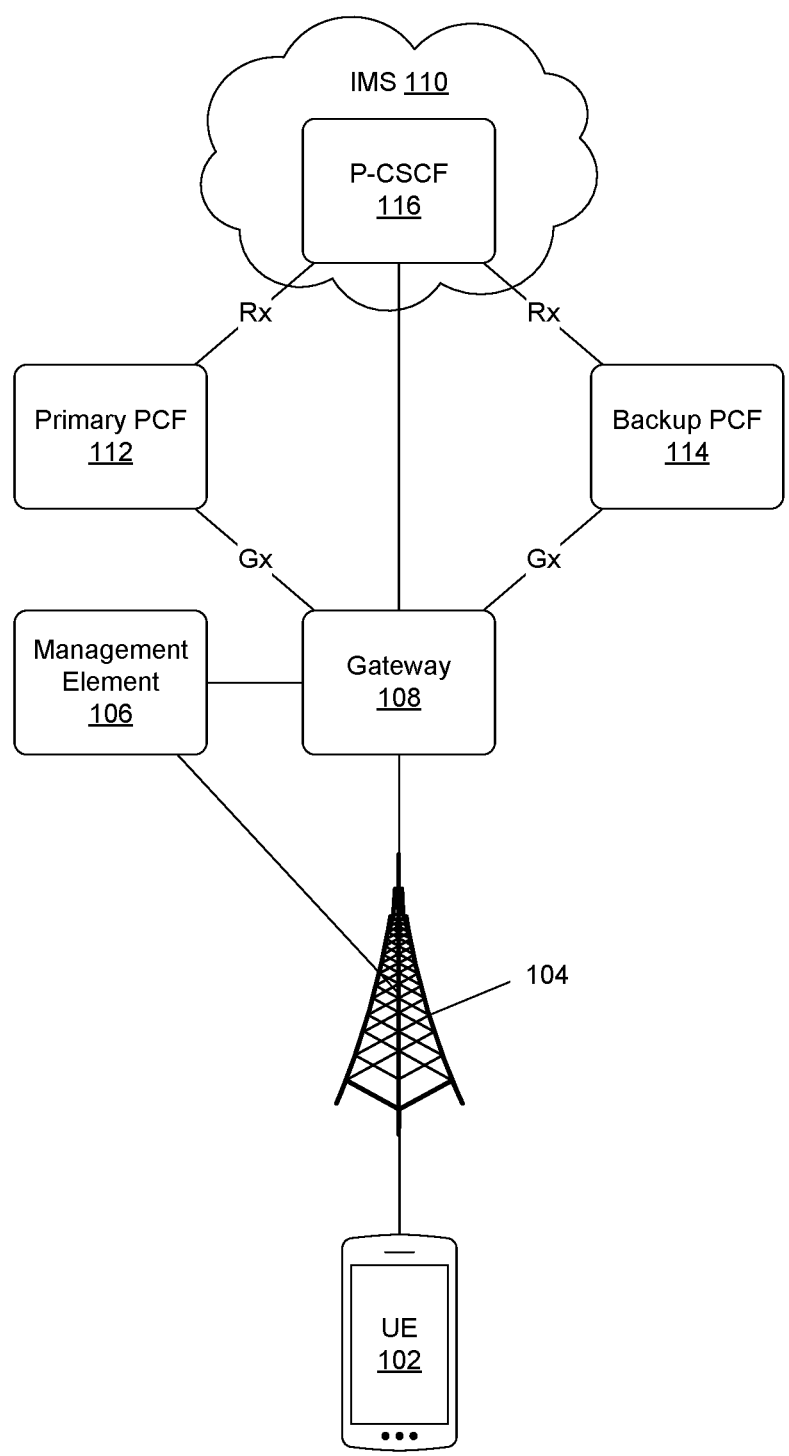
FIG. 1 depicts an example network environment in which user equipment (UE) can connect to a telecommunication network.

A telecommunication network can include a core network, an IP Multimedia Subsystem (IMS), and Policy Control Functions (PCFs). The core network can process and route data packets, the IMS can set up and/or manage communication sessions that use such data packets, and a PCF can provide Policy and Charging Control (PCC) rules defining how such data packets should be processed by the core network.

A PCF can be connected via Diameter protocol Gx interfaces to gateways of the core network. When a user equipment (UE) connects to a gateway, the gateway and the PCF can establish a Gx session over a Gx interface to exchange information about communications associated with that UE. The PCF can store Gx binding information about such established Gx sessions.

The PCF can also be connected via Diameter protocol Rx interfaces to elements of the IMS. For example, the PCF can be connected via an Rx interface to a Proxy Call Session Control Function (P-CSCF) or other application function (AF) of the IMS. When an P-CSCF receives a request from a UE regarding a communication session, the P-CSCF can use the Rx interface to request that the PCF provide the core network with PCC rules for that communication session. For example, if the UE requests initiation of a voice call, the P-CSCF can send a request over an Rx interface to the PCF asking the PCF to provide the core network with PCC rules associated with setup of a dedicated bearer for voice call data. In this situation, the PCF can use its stored Gx binding information to identify a Gx session previously established with the gateway that is handling traffic for the UE. The PCF can accordingly send new or updated PCC rules to that gateway over the previously established Gx session, and the gateway can apply the PCC rules.

However, if a PCF is offline or cannot be reached by the gateway and/or the P-CSCF, new and existing communication sessions for a UE can fail. For example, when the PCF is offline entirely, the gateway would not be able to contact the PCF via an Gx interface, and the P-CSCF would also not be able to contact the PCF via an Rx interface. In this situation, the offline PCF would be unreachable by both the gateway and the P-CSCF, such that the P-CSCF could not use an Rx interface to request that the PCF provide PCC rules to the gateway for a new or existing communication session, and the gateway would not receive PCC rules for the communication session over a Gx interface such that the communication session fails.

As another example, if the PCF is online but a problem exists with the Gx interface between the gateway and the PCF, the gateway may be unable to establish a Gx session with the PCF. In this situation, when no Gx session is established between the gateway and the PCF for the UE, the gateway would not store Gx binding information associated with the UE. As such, even if the P-CSCF is able to use an Rx interface to request that the PCF provide the gateway with PCC rules for a new communication session, the PCF would return an error to the P-CSCF indicating that the PCF could not find a Gx session for the UE in its Gx binding information. Accordingly, the new communication session would fail because no Gx session was established that the PCF could use to provide the gateway with the PCC rules for the communication session. For example, a communication session for a requested voice call would fail when the PCF is not able to provide a gateway with PCC rules for a dedicated bearer for the voice call.

In some conventional systems, when a communication session fails due to an offline PCF or a broken Gx interface, setup of the communication session can be retried from the beginning via another PCF in the same pool of PCFs. However, this can cause delays and/or itself be unsuccessful. For example, if the gateway is linked to a pool of PCFs assigned to a particular geographical area where the UE is located, but all PCFs in that pool have gone offline due to errors introduced by a software update, a power outage, or any other issue, the gateway would be unable to establish a Gx session with any of the PCFs in the pool and setup of the communication session would again fail.

In some examples, circuit-switched fallback procedures may allow UEs to retry failed communication sessions on legacy circuit-switched networks that do not involve an IMS or PCFs. For example, in an emergency situation in which a UE was attempting to make a 911 call or other emergency call to a public-safety answering point (PSAP), if the emergency call ultimately fails on a packet-switched network because of issues caused by an offline PCF or a broken Gx interface as described above, the UE may be able to use circuit-switched fallback procedures to retry the emergency call on a legacy circuit-switched network. However, in many places a legacy circuit-switched network may not be available or accessible by the UE, especially as network operators continue to focus their efforts on newer packet-switched networks and decommission legacy network hardware. Accordingly, in some areas there may be no underlying circuit-switched coverage that the UE could use to attempt circuit-switched fallback procedures. Even if a legacy circuit-switched network is available, the legacy circuit-switched network may become overloaded if numerous UEs begin using circuit-switched fallback procedures when their communication sessions fail due to offline PCFs or broken Gx interfaces.

Accordingly, circuit-switched fallback procedures may not be a reliable backup option when communication sessions fail due to an offline PCF or a broken Gx interface. Such a lack of a reliable backup circuit-switched fallback option can be a problem for all types of communication sessions, but be especially problematic for emergency calls and other critical and time-sensitive types of communication sessions.

This disclosure describes systems and processes that allows Gx failures associated with a primary PCF to be detected early, before an attempt to set up a communication session fails entirely. When such failures are detected in association with a primary PCF, a different type of PCF acting as a backup can be contacted over Gx and Rx interfaces. For example, the backup PCF can be associated with a different network generation than the primary PCF, such that errors affecting Gx session setup with the primary PCF may be less likely to occur with a different-generation backup PCF.

Communication sessions can thus be successfully set up though a different type of backup PCF, without setup of the communication session failing overall and then needing to be retried in the same way or be attempted through alternative circuit-switched fallback methods. Early detection of Gx session failures can thus allow self-healing of a telecommunication network by setting up alternate Gx sessions instead of letting communication sessions fail. Accordingly, the early Gx session failure detection and self-healing processes described herein can make setup of communication sessions through packet-switched networks more reliable, and thereby decrease the use of circuit-switched fallback procedures for emergency calls and other types of communications.

Example Environments

FIG. 1 depicts an example network environment in which user equipment (UE) 102 can connect to a telecommunication network to engage in communication sessions for voice calls, video calls, messaging, data transfers, or any other type of communication. A UE 102 can be any device that can wirelessly connect to the telecommunication network. For example, a UE 102 can be a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device.

The telecommunication network can include a core network that UEs 102 can access through connections to base stations 104. Base stations 104 can be access points that UEs 102 can wirelessly connect to in order to reach elements of the core network and other networks, as discussed below. The core network and/or base stations 104 can be compatible with one or more wireless access technologies, protocols, or standards. For example, wireless access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of wireless access technology.

In some examples, base stations 104 can be part of a radio access network linked to the core network. For example, in an LTE network a base station 104 can be an evolved Node B (eNB), while in a 5G network a base station 104 can be referred to as a gNB. In other examples, a base station 104 can be a Wi-Fi access point or other access point that can be connected to the core network through the Internet or another type of connection.

The telecommunication network's core network can include multiple components, including a management element 106 and gateways 108. The management element 106 can be a control node that can assist in setting up and managing connections within the core network for UEs, for example by retrieving profiles of subscribers associated with the UEs 102 from a Home Subscriber Server (HSS) or other element, and/or by selecting particular gateways 108 to handle connections for individual UEs 102.

Gateways 108 can be nodes that link the core network to base stations 104, other networks such as the Internet or an IP Multimedia Subsystem (IMS) 110, and/or elements including a primary Policy Control Function (PCF) 112 and a backup PCF 114. Gateways 108 can set up default and/or dedicated bearers for UEs 102 within the core network, and route data packets associated with UE 102 connections. Example architecture for a gateway 108 is illustrated in greater detail in FIG. 5, and is described in detail below with reference to that figure.

As will be described in more detail below, a gateway 108 can connect to a primary PCF 112 and/or a backup PCF 114 via Diameter Gx interfaces, such that the gateway 108 can exchange messages with the primary PCF 112 and/or the backup PCF 114 over the Gx interfaces using the Diameter protocol. For a particular UE 102, a gateway 108 and either the primary PCF 112 or the backup PCF 114 can establish a Gx session, and the primary PCF 112 or the backup PCF 114 can store Gx binding information about Gx session established with the gateway 108 for the UE 102. In some examples, the gateway 108 can establish a passive Gx session with the backup PCF 114 prior to attempting to set up Gx sessions with the primary PCF 112, such that the gateway 108 can use the passive Gx session to contact the backup PCF 114 and create Gx session binding for a UE 102 in situations where the gateway 108 cannot establish Gx sessions with the primary PCF 112.

Figure 2:
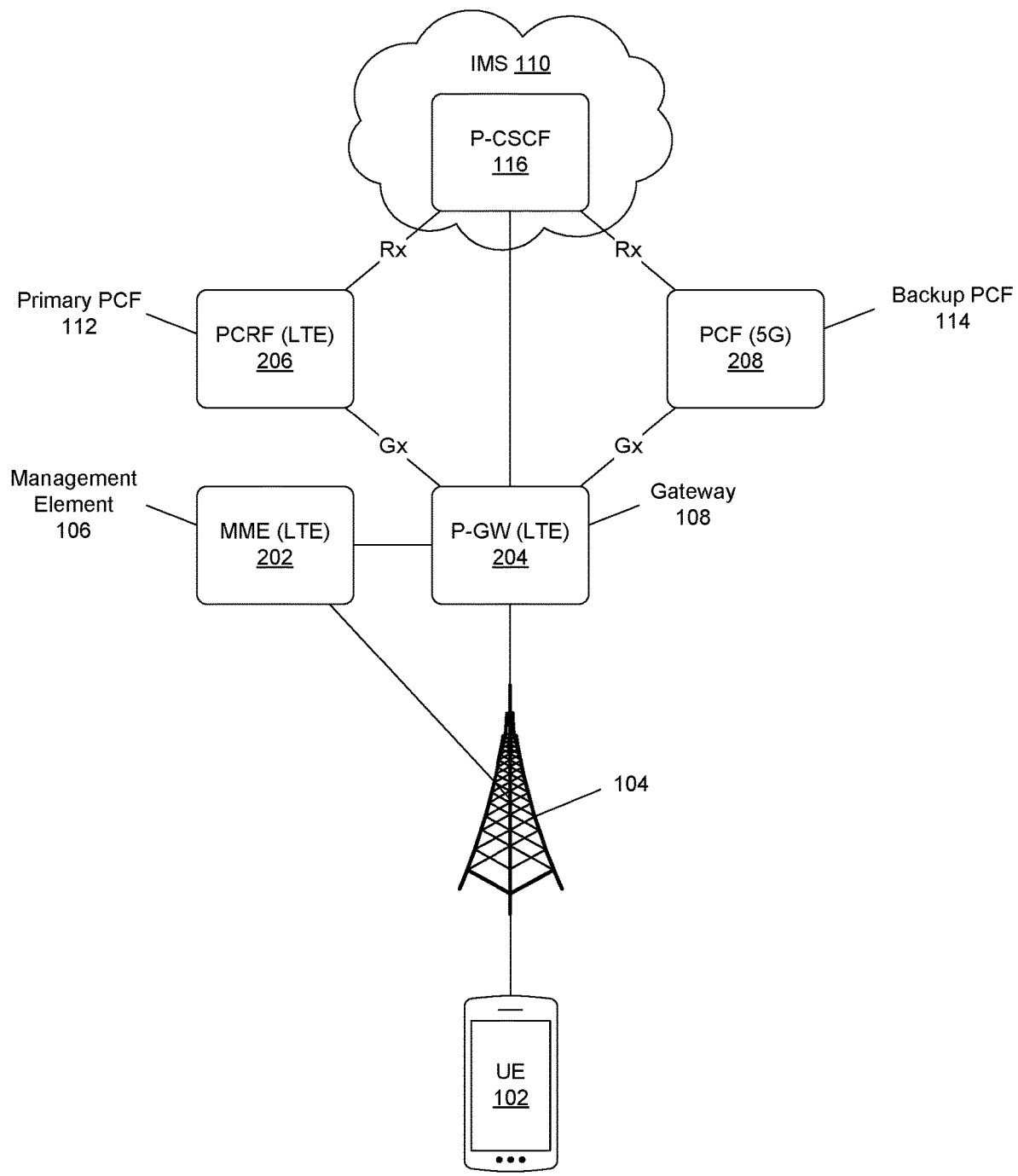
FIG. 2 depicts an example in which a core network is an LTE EPC, the gateway is an LTE P-GW, and the primary PCF is an LTE PCRF, while the backup PCF is a 5G PCF.
Figure 3:
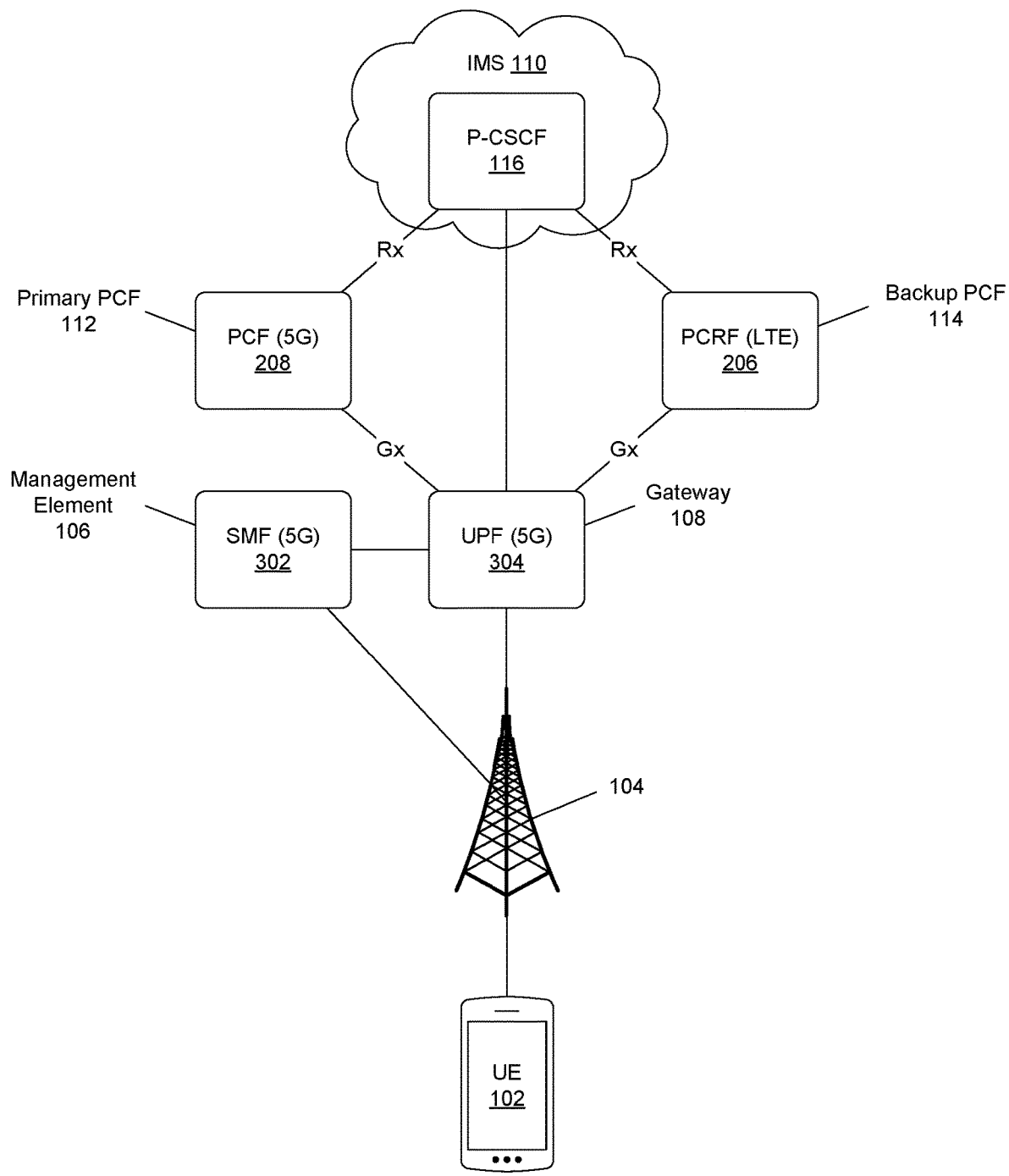
FIG. 3 depicts an example in which the core network is a 5G core network, the gateway is a 5G UPF, and the primary PCF is a 5G PCF, while the backup PCF is an LTE PCRF.

The names and/or types of the management element 106 and gateways 108 can vary depending on the type of the core network. For example, FIG. 2 depicts an example in which the core network is an LTE Evolved Packet Core (EPC). In an LTE EPC, the management element 106 can be a Mobility Management Entity (MME) 202, and the gateways 108 can include Packet Data Network (PDN) Gateways (P-GWs) 204. A P-GW 204 can be a link between the core network and the IMS 110, and also connect to the primary PCF 112 and the backup PCF 114. Although only a P-GW 204 is shown as a gateway 108 in FIG. 2, the P-GW 204 may be linked to the MME 202 and/or base station 104 though another type of gateway 108, a Serving Gateway (S-GW). As another example, FIG. 3 depicts an example in which the core network is a 5G core network. In a 5G core network, the management element 106 can be a Session Management Function (SMF) 302, and the gateways 108 can include User Plane Functions (UPFs) 304.

The IMS 110 can include nodes and/or application functions (AFs) that perform various operations to implement services with respect to communication sessions for a UE 102, such as services for voice calls, video calls, or any other type of communication. For example, the IMS 110 can include a Proxy Call Session Control Function (P-CSCF) 116, also known as a Session Border Controller (SBC) or Session Border Gateway (SBG), that serves as an entry point to the IMS 110. A P-CSCF 116 can be communication with gateways 108 of the core network, such that the P-CSCF 116 can exchange Session Initiation Protocol (SIP) messages with individual UEs 102 through gateways 108 associated with those UEs 102. For instance, a P-CSCF 116 can receive a SIP message from a UE 102 requesting setup of a voice call (such as a Voice over LTE (VoLTE) call), a video call (such as a Video over LTE (ViLTE) call), or a session associated with any other type of communication or service. As another example, the IMS 110 can include an AF known as aa Web Real-Time Communication (WebRTC) Gateway (WRG), which can be an interface within the IMS 110 between web traffic and SIP messages, such that web traffic from a user originating from a web browser or other interface can be translated into SIP messages for setting up or managing a communication session via the telecommunication network. The IMS 110 can also include other Call Session Control Functions (CSCFs), such as Interrogating-CSCFs (I-CSCFs) and/or a Serving-CSCFs (S-CSCFs), and/or other application functions that can process, generate, and/or route SIP messages, and/or otherwise manage elements of communication sessions. Example architecture for an IMS element, such as a P-CSCF 116, is illustrated in greater detail in FIG. 6, and is described in detail below with reference to that figure.

As will be discussed further below, a P-CSCF 116 or other AF of the IMS 110 can also connect to a primary PCF 112 and/or a backup PCF 114 via Diameter Rx interfaces, such that the P-CSCF 116 or other AF can exchange messages with the primary PCF 112 and/or the backup PCF 114 over the Rx interfaces using the Diameter protocol. In some examples, a P-CSCF 116 or other AF can establish different Rx sessions with a primary PCF 112 and a backup PCF 114 as peer Rx sessions.

As described above, a primary Policy Control Function (PCF) 112 and a backup PCF 114 can be linked to a gateway 108 of a core network through Diameter Gx interfaces, and also be linked to a P-CSCF 116 or other AF of an IMS 110 through Diameter Rx interfaces. In some examples, a primary PCF 112 can also be referred to as an active PCF, while a backup PCF 114 can also be referred to as a standby PCF or a passive PCF. Example architecture for a PCF is illustrated in greater detail in FIG. 7, and is described in detail below with reference to that figure.

The primary PCF 112 and the backup PCF 114 can maintain Policy and Charging Control (PCC) policies corresponding to attributes of communication session types, service types, subscriber or account types, a Quality of Service (QoS) level, and/or any other attribute. PCC policies can define PCC rules that can be applied to particular communication sessions for UEs 102 initiated via the IMS 110. For example, PCC rules can specify that data packets of a communication session should be given a certain priority level, be transmitted at least at a minimum bitrate, be transmitted on certain bearers, and/or be treated in any other specified way. In some examples, PCC rules can also define how a customer account is to be charged based on how data packets are transmitted or treated during a communication session.

The primary PCF 112 and the backup PCF 114 can correspond to different network generations, such as different generations of wireless access technologies, protocols, or standards. In some examples, the primary PCF 112 may correspond to the same generation as the core network, while the backup PCF 114 corresponds to an earlier or later generation than the core network. The gateway 108 may be associated with the same generation as the core network overall, and be configured to use a same-generation PCF as the primary PCF 112. Accordingly, as will be described further below, the gateway 108 can be configured to first attempt to contact a same-generation PCF as a primary PCF 112. However, if the gateway 108 cannot successfully reach a same-generation primary PCF 112 over a Gx interface, the gateway 108 can be configured to contact a different-generation backup PCF 114 over a Gx interface. For example, the gateway 108 may have previously established a passive Gx session with the backup PCF 114, such that the gateway 108 can use the already-existing passive Gx session to contact the backup PCF 114 when the gateway 108 cannot set up a Gx session with the primary PCF 112. Although the primary PCF 112 and the backup PCF 114 can be associated with different network generations, both can store the same or substantially similar PCC rules for communication sessions, such that either can send appropriate PCC rules to a gateway 108 of the same or a different network generation.

FIG. 2 depicts an example in which the core network is an LTE EPC, the gateway 108 is an LTE P-GW 204, and the primary PCF 112 is an LTE Policy and Charging Rules Function (PCRF) 206, while the backup PCF 114 is a 5G PCF 208. Accordingly, the 5G PCF 208 can serve as a backup PCF 114 even though the 5G PCF 208 is associated with a later network generation than the LTE EPC and its P-GWs 204. The 5G backup PCF 114 can thus assist in setting up a communication session for a UE connected to an LTE gateway 108, regardless of whether or not the UE 102 itself is 5G-compatible.

FIG. 3 depicts another example in which the core network is a 5G core network, the gateway 108 is a 5G UPF 304, and the primary PCF 112 is a 5G PCF 208, while the backup PCF 114 is an LTE PCRF 206. Accordingly, the LTE PCRF 206 can serve as a backup PCF 114 even though the LTE PCRF 206 is associated with an earlier network generation than the 5G core network and its UPFs 304.

In some examples, a telecommunication network can operate different generations of core networks concurrently, such that a PCF of a particular generation can be used as both a primary PCF 112 for gateways 108 of the same generation as well as a backup PCF 114 for gateways 108 of different generations. For example, an LTE PCRF 206 can be considered as a primary PCF 112 for LTE P-GWs 204, but the same LTE PCRF 206 can be considered as a backup PCF 114 for 5G UPFs 304. Accordingly, a particular PCF may primarily handle connections from same-generation gateways 108, but be available to step in as a backup PCF 114 when needed to handle connections from different-generation gateways 108.

In some examples, the telecommunication network may have a pool of primary PCFs 112 and/or a pool of backup PCFs 114. For instance, an LTE network can have a set of LTE PCRFs 206 that are used as a pool of primary PCFs 112 for a particular area, but also have access to a pool of 5G PCFs 208 that can serve as backup PCFs 114.

The primary PCF 112 and the backup PCF 114 can maintain Gx binding information about Gx sessions that have been established between it and gateways 108 for UEs 102. When a primary PCF 112 or a backup PCF 114 needs to send a message to a gateway 108 about a communication session for a particular UE 102, such as when the primary PCF 112 or the backup PCF 114 receives information about a communication session from a P-CSCF 116 over an Rx session and is configured to send new or updated PCC rules to a gateway 108 for the communication session, the primary PCF 112 or the backup PCF 114 can use its Gx binding information to identify a previously established Gx session associated with that UE 102 and/or to identify the particular gateway 108 associated with that UE 102. The primary PCF 112 or the backup PCF 114 can then use that Gx binding information to send the message, for instance a message including new or updated PCC rules, to the gateway 108 over the established Gx session.

For example, in FIG. 2, the primary PCF 112 or the backup PCF 114 can receive information about a communication session for a UE 102 from a P-CSCF 116 over an Rx interface, and in response use its Gx binding information to identify a Gx session previously established with P-GW 204 for the UE 102. The primary PCF 112 or the backup PCF 114 can thus send PCC rules for the UE's communication session to the P-GW 204 over the identified Gx session, and the P-GW 204 can apply the PCC rules to the communication session. For instance, the P-GW 204 can have a Policy and Charging Enforcement Function (PCEF) that analyses data packets, determines which communication session the data packets are associated with, and applies any applicable PCC rules to those data packets. In some examples, if PCC rules are associated with a type of bearer that has not yet been set up in the core network, such as a default bearer or dedicated bearer, receipt of the PCC rules at the P-GW 204 can cause the P-GW 204 to set up that type of bearer and then apply the PCC rules to traffic associated with that bearer.

Although a gateway 108 can attempt to establish a Gx session with a primary PCF 112 associated with the same network generation as the gateway 108 as described above, in some examples the gateway 108 cannot establish a Gx session with the primary PCF 112. For example, the primary PCF 112 may be offline, or a problem may exist with the Gx interface between the gateway 108 and the primary PCF 112, such that a Gx session cannot be established between the gateway 108 and the primary PCF 112. However, in this situation, the gateway 108 can follow policy rules that automatically trigger actions for the gateway 108 to contact a backup PCF 114 of a different network generation over a Gx interface such that a GX binding is created at the backup PCF 114 between the gateway 108 and the backup PCF 114 for the UE 102. The gateway 108 can thus be network-aware, and take alternative action based on the policy rules to self-heal the telecommunication network by establishing a Gx session binding with a backup PCF 114 when a Gx session with the primary PCF 112 cannot be established.

For example, the gateway 108 may have previously created a passive Gx session with the backup PCF 114 that it can use to contact the backup PCF 114 and create a Gx session binding for the UE 102 when the gateway cannot establish a Gx session with the primary PCF 112. In some examples, the gateway 108 can use an existing passive Gx session with the backup PCF 114 to contact the backup PCF 114 about a communication session for a UE 102. Based on that contact over the passive Gx session, a new active Gx session for the UE 102 can be established between the gateway 108 and the backup PCF 114 and the backup PCF 114 can store corresponding Gx binding information about the new active Gx session. In other examples, a gateway's use of an existing passive Gx session to contact a backup PCF 114 about a communication session for a UE 102 may convert the passive Gx session to an active Gx session between the gateway 108 and the backup PCF 114 for the UE 102, and the backup PCF 114 can create or update associated Gx binding information. In still other examples, if a passive Gx session with the backup PCF 114 does not already exist, the gateway 108 can establish a new Gx session with the backup PCF 114 for the UE 102, and the backup PCF 114 can create Gx binding information about the new Gx session for the UE 102.

Because the backup PCF 114 may be associated with a different network generation than the primary PCF 112, issues that may have affected the primary PCF 112 and prevented establishment of a Gx session with the primary PCF 112 may not have affected the backup PCF 114, and a Gx session binding for the UE 102 can be established between the gateway 108 and the backup PCF 114. For example, software issues that may have caused one or more LTE PCRFs 206 to go offline may not have affected 5G PCFs 208. Accordingly, in the example of FIG. 2, an LTE P-GW 204 can establish Gx session binding for a UE 102 with a 5G PCF 208 instead of an LTE PCRF 206, and the 5G PCF 208 can store Gx binding information about the Gx session established between the LTE P-GW 204 and the 5G PCF 208 for the UE 102.

Similarly, although a P-CSCF 116 or AF can attempt to send information about a UE's communication session to a primary PCF 112 over an Rx session as described above, in some examples the P-CSCF 116 or AF cannot reach the primary PCF 112, or the primary PCF 112 cannot locate Gx binding information associated with the UE 102. For example, a P-CSCF 116 may be unable to contact the primary PCF 112 over an Rx session if the primary PCF 112 is offline or if there is a problem with the Rx interface between the P-CSCF 116 and the primary PCF 112. As another example, a P-CSCF 116 may be able to use an Rx session to successfully contact a primary PCF 112 about a UE's communication session, but the primary PCF 112 may be unable to locate Gx binding information associated with the UE 102 because there was a Gx interface failure between the gateway 108 and the primary PCF 112 such that no Gx session was ever established with the primary PCF 112 in association with the UE 102. In these situations, a P-CSCF 116 or AF can use a peer Rx session to instead contact the backup PCF 114 about the communication session for the UE 102. As discussed above, the backup PCF 114 may have established a Gx session with the gateway 108 associated with the UE 102 and stored corresponding Gx binding information as discussed above. The backup PCF 114 can accordingly use its Gx binding information to find the established Gx session and contact the gateway 108 about the UE's communication session, for example by sending new PCC rules to the gateway 108 over the Gx session.

In some examples, a P-CSCF 116 or other AF of the IMS 110 can determine which PCFs are the primary PCF 112 and the backup PCF 114 based on a type or configuration of the P-CSCF 116 or the AF, or the type of service associated with a requested communication session. For example, when a P-CSCF 116 is configured to assist with setup of VoLTE calls or SIP message received from a UE 102 requests setup of a VoLTE call, the P-CSCF 116 can consider an LTE PCRF 206 to be the primary PCF 112 and a 5G PCF 208 to be the backup PCF 114. However, if the P-CSCF 116 is configured to assist with 5G-specific services or receives a SIP message about a 5G-specific service, the P-CSCF 116 can consider a 5G PCF 208 to be the primary PCF 112 and an LTE PCRF 206 to be the backup PCF 114.

Figure 4:
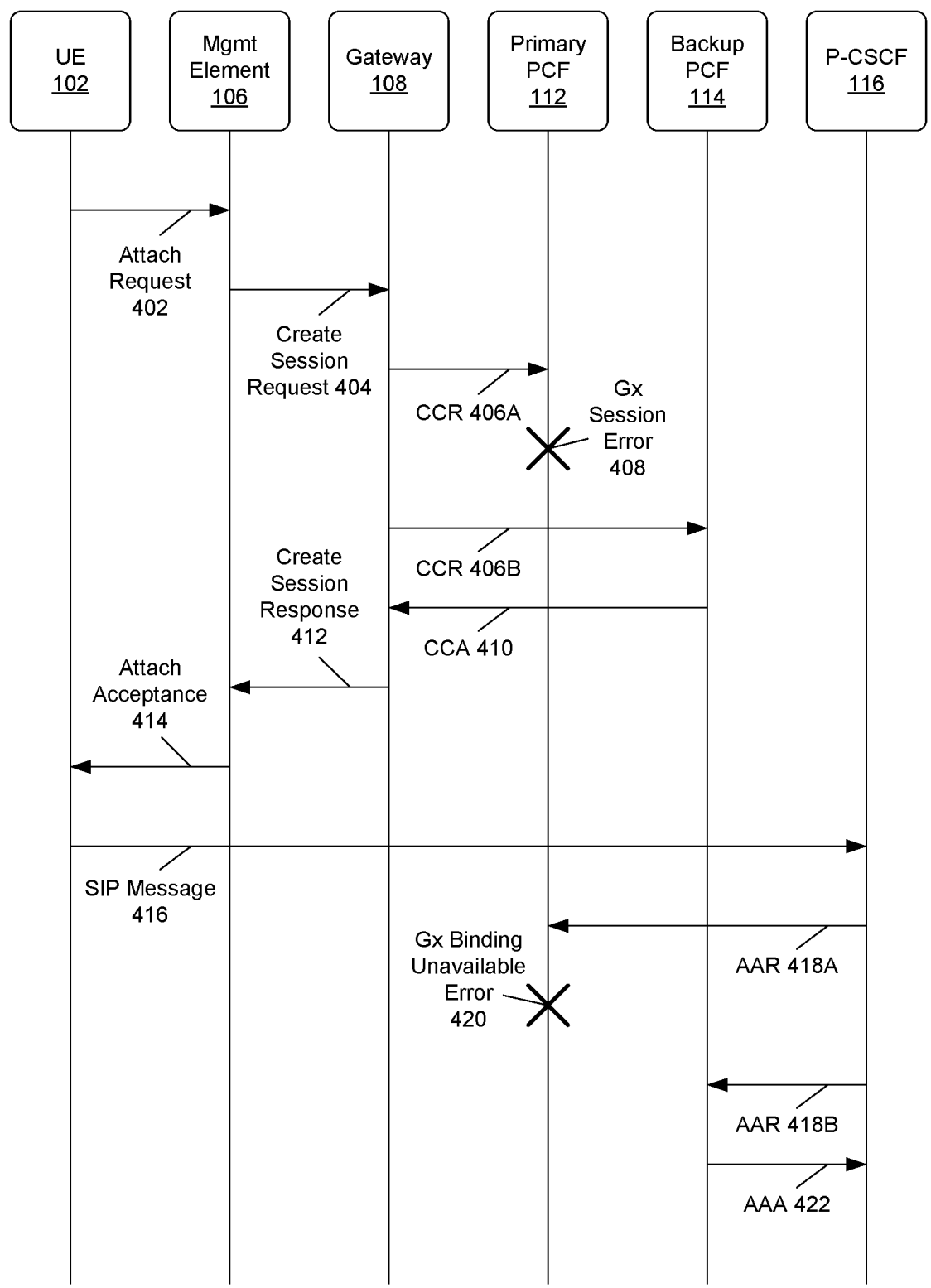
FIG. 4 depicts a sequence diagram showing messages sent between a UE and elements of a telecommunication network to prevent a new communication session from failing when a primary PCF is unreachable.

FIG. 4 depicts a sequence diagram showing messages sent between a UE 102 and elements of a telecommunication network. The messages shown in FIG. 4 can prevent a new communication session for a UE 102 from failing when a primary PCF 112 is unreachable due to Gx and/or Rx session issues by instead setting up the communication session in part using Gx and Rx sessions with a different-generation backup PCF 114.

When a UE 102 connects to a base station 104, the UE 102 can send an attach request 402 through the base station 104 to the core network's management element 106, such as an MME 202 or SMF 302. In some examples, the attach request 402 can specify an Access Point Name (APN) of a PDN that the UE 102 has requested to be connected to, for instance the IMS 110. In other examples, the management element 106 can look up a profile associated with the UE 102, for example by retrieving a subscriber profile from an HSS, and find a default APN listed in the profile for the UE, such as the IMS 110.

The management element 106 can select one or more gateways 108 of the core network for the UE 102, for instance by selecting an S-GW and a P-GW 204 for the UE 102 in an LTE EPC or by selecting a UPF 304 for the UE 102 in a 5G core network. The management element 106 can then send a create session request 404 to a selected gateway, such as a P-GW 204 or UPF 304. The create session request 404 can include information from the attach request 402 and/or the profile, such as an international mobile subscriber identity (IMSI) or the APN.

Based on receipt of the create session request 404, the gateway 108 can attempt to send a credit control request (CCR) 406 over a Gx interface to a primary PCF 112. The CCR 406 can identify attributes associated with the UE 102 or a corresponding user profile, such as the IMSI and the APN.

However, a Gx session error 408 can occur in response to the CCR 406. A Gx session error 408 can be an explicit error message returned to the gateway 108 from the primary PCF 112, or be a timeout error when the gateway 108 does not receive a response to the CCR 406 from the primary PCF 112 within a predetermined period of time. For example, the primary PCF 112 may return an explicit Gx session error 408 message indicating that the primary PCF 112 is overloaded or is experiencing problems that prevent it from processing the CCR 406. As another example, if the primary PCF 112 is offline or the Gx interface between the gateway 108 and the primary PCF 112 is broken for any reason such that the CCR 406 cannot reach the primary PCF 112 over the Gx interface, the primary PCF 112 may not respond to the CCR 406 within a predetermined period of time. Accordingly, the gateway 108 can wait for a response to the CCR 406, but determine that a timeout error has occurred when no response to the CCR 406 is received from the primary PCF 112 within the predetermined period of time.

In conventional systems, a Gx session error 408 may lead to a UE's attachment to the telecommunication network failing immediately, or the UE 102 attaching to the telecommunication network when no Gx session has been established between a gateway 108 and a PCF. Accordingly, in such conventional systems new communication sessions may fail because corresponding PCC rules cannot be provided by the PCF to the gateway 108 over the non-established Gx session.

However, as described herein, when a Gx session error 408 occurs, here the gateway 108 can use policy rules to determine a next action that may prevent failure of attempted communication sessions, such as sending the CCR 406 to a backup PCF 112 over a Gx interface. In some examples, the gateway 108 and the backup PCF 114 may have previously established a passive Gx session for use in cases when the gateway 108 cannot establish a Gx session with the primary PCF 112, and the CCR 406 can be sent to the backup PCF 114 over the previously established passive Gx session. In other examples, the gateway 108 can establish a new Gx session with the backup PCF 114 after a Gx session error 408 occurs, and the CCR 406 can be sent to the backup PCF 114 over the new Gx session. The gateway's policy rules can therefore allow the telecommunication network to self-heal and prevent communication session failures when Gx session errors 408 are detected.

For example, when the gateway 108 sends a CCR 406A to the primary PCF 112 but a Gx session error 408 occurs, the gateway's policy rules can trigger the gateway 108 to send a CCR 406B to the backup PCF 114 over a Gx interface. CCR 406B can be substantially similar to CCR 406A, and also include an IMSI, APN, and/or other information that had been included in CCR 406A. As noted above, the backup PCF 114 can be associated with a different network generation than the primary PCF 112 and/or the gateway 108. For example, when the gateway 108 is an LTE P-GW 204 and the primary PCF 112 is an LTE PCRF 206, but the LTE PCRF 206 does not respond to a CCR 406A from the LTE P-GW 204, the LTE P-GW 204 can send a CCR 406B to a 5G PCF 208 acting as a backup PCF 114. As another example, when the gateway 108 is a 5G UPF 304 and the primary PCF 112 is a 5G PCF 208, but the 5G PCF 208 does not respond to a CCR 406A from the 5G UPF 304, the 5G UPF 304 can send a CCR 406B to an LTE PCRF 206 acting as a backup PCF 114.

In some examples, the gateway 108 can track statistics about responses to CCRs 406 sent to the primary PCF 112, such as a failure rate indicating how frequently Gx session errors 408 occur relative to CCRs 406 that are sent. In these examples, the policy rules may indicate that if the failure rate is below a threshold value, the gateway 108 should, upon a Gx session error 408, re-try sending a CCR 406 to the primary PCF 112 or another primary PCF 112 in a pool of primary PCFs 112. However, the policy rules may also indicate that if the failure rate is at or above the threshold value, the gateway 108 should, upon a Gx session error 408, instead send the CCR 406 to a backup PCF 114 of a different network generation rather than the primary PCF 112. In other examples, the policy rules may indicate that the gateway 108 should immediately send the CCR 406 to a backup PCF 114 upon a single occurrence of a Gx session error 408, send the CCR 406 to a backup PCF 114 when a count of failed CCRs 406 sent to the primary PCF 112 exceeds a threshold, or upon the occurrence of any other criteria or condition.

In some examples, comparing a failure rate or other statistics associated with sent CCRs 406 and occurrences of Gx session errors 408 can cause a gateway 108 to predict that a primary PCF 112 is unreliable or is likely to fail even if the primary PCF 112 is not yet entirely offline or inaccessible. For example, when a primary PCF 112 is overloaded, the primary PCF 112 may still be able to respond normally to some CCRs 406. However, when a failure rate tracked by the gateway 108 shows that timeout errors have been occurring in association with the primary PCF 112 more frequently than a predefined threshold, even though the primary PCF 112 may have responded to some CCRs 406 in a timely manner, the gateway 108 can use policy rules to determine that the primary PCF 112 is unreliable or may be near failure. Accordingly, the policy rules can, in response to the Gx session error 408, automatically trigger the gateway 108 to switch to a backup PCF 114 and send the CCR 406 to the backup PCF 114.

After the gateway 108 sends a CCR 406 to the backup PCF 114 over a Gx interface, the backup PCF 114 can respond by returning a credit control answer (CCA) 410 to the gateway 108 over the Gx interface. The CCA 410 can indicate that a Gx session binding has been established between the gateway 108 and the backup PCF 114 with respect to the UE 102. The backup PCF 114 can also store Gx binding information associated with the established Gx session, such that the backup PCF 114 can later use the Gx binding information to identify the gateway 108 and the Gx session associated with the UE 102. For example, the Gx binding information can identify attributes of the Gx session, such as identifiers for the UE 102, the gateway 108, an APN, such as an APN for the IMS 110, and/or any other attribute.

When the gateway 108 receives a CCA 410 from the backup PCF 114, the gateway 108 can send a create session response 412 to the management element 106, which can in turn send an attach acceptance 414 to the UE 102. At this point, the UE 102 can be attached to the core network and a data session or default bearer for the UE 102 can exist within the core network, despite the occurrence of the Gx session error 408 associated with the primary PCF 112. Similarly, despite the occurrence of the Gx session error 408 associated with the primary PCF 112, Gx session binding can have been established for the UE 102 between the gateway 108 and the backup PCF 114. Accordingly, as will be discussed below, the backup PCF 114 can use the established Gx session binding to provide the gateway 108 with PCC rules for a communication session, thereby preventing failure of the communication session due to non-established Gx session binding.

After the UE 102 has attached to the core network, the UE 102 can send a Session Initiation Protocol (SIP) message 416 about a communication session to the P-CSCF 116. For example, the UE 102 can send the P-CSCF 116 a SIP REGISTER message or a SIP INVITE message to initiate a voice call. In some examples, the UE 102 may have been given an IP address for the P-CSCF 116 during attachment to the core network such that the UE 102 can send SIP messages to the P-CSCF 116.

When the P-CSCF 116 receives a SIP message from a UE 102, the P-CSCF 116 can attempt to set up resources in the core network for a communication session for the UE 102. This attempt can include asking a PCF to provide PCC rules applicable to the communication session to a gateway 108 associated with the UE 102. However, although the gateway 108 may have determined based on the Gx session error 408 that the primary PCF 112 is offline or cannot be contacted via an Gx interface as discussed above, there may be no message format defined that would allow the gateway 108 to inform the P-CSCF 116 that the primary PCF 112 may be offline or that the gateway 108 could not establish a Gx session with the primary PCF 112 and established a Gx session with the backup PCF 114 instead.

Accordingly, the P-CSCF 116 can first attempt to contact the primary PCF 112 about the UE's communication session by attempting to send the primary PCF 112 an Authorize/Authenticate Request (AAR) 418 message over an Rx interface. The AAR 418 can include an identifier for the UE 102, an identifier for the type of communication session, and/or any other information, and request that the primary PCF 112 send PCC rules applicable to the communication session to a gateway 108 associated with the UE 102. For example, when the P-CSCF 116 received a SIP message 416 from a UE 102 requesting initiation of a VoLTE call, the P-CSCF 116 can identify an LTE PCRF 206 as the primary PCF 112 and attempt to send an AAR 418 to the LTE PCRF 206. The P-CSCF 116 can attempt to send the AAR 418 to the primary PCF 112 to request that the primary PCF 112 use Gx binding information stored at the primary PCF to identify a P-GW 204 associated the UE 102 and use a previously established Gx session to provide the P-GW 204 with PCC rules for a dedicated bearer for the VoLTE call. However, as discussed above, the primary PCF 112 may not have such Gx binding information because a Gx session error 408 occurred and no Gx session was established between the gateway 108 and the primary PCF 112 for the UE 102.

Accordingly, a Gx binding unavailable error 420 can occur in response to the AAR 418 sent by the P-CSCF 116 to the primary PCF 112. In some examples, a Gx binding unavailable error 420 can be an explicit error message returned to the P-CSCF 116 from the primary PCF 112. For example, the primary PCF's Gx binding information may not include information about a Gx session between the primary PCF 112 and the gateway 108 for the UE 102 when the Gx interface between the primary PCF 112 and the gateway 108 was broken and a Gx session error 408 occurred. Accordingly, the primary PCF 112 would not be able to find information about an established Gx session with a gateway 108 for the UE 102 in its Gx binding information in response to the P-CSCF's AAR 418. The primary PCF 112 can therefore return a Gx binding unavailable error 420 to the P-CSCF 116 as an explicit message over the Rx interface indicating that the primary PCF 112 has no Gx binding information about the UE 102, for example as a Diameter 5065 "IP-CAN_SESSION_NOT_A-VAILABLE" message. In other examples, the primary PCF 112 may return another type of Gx binding unavailable error 420 message indicating that the primary PCF 112 is overloaded or is experiencing problems that prevent it from processing the AAR 418.

In other examples, if the primary PCF 112 is offline or the Rx interface between the P-CSCF 116 and the primary PCF 112 is broken for any reason such that the AAR 418 cannot reach the primary PCF 112, the primary PCF 112 may not respond to the AAR 418 within a predetermined period of time. Accordingly, the P-CSCF 116 can wait for a response to the AAR 418, but determine that a Gx binding unavailable error 420 has occurred when no response to the AAR 418 is received from the primary PCF 112 within the predetermined period of time.

In conventional systems, a Gx binding unavailable error 420 may lead to the failure of a new communication session. For example, when a Gx binding unavailable error 420 occurs because a PCF cannot find Gx binding information associated with a UE 102, the PCF cannot use an established Gx session to send PCC rules to gateway 108 about how to treat data of that communication session, and setup of the communication session can accordingly fail. However, as described herein, when a Gx binding unavailable error 420 occurs, here the P-CSCF 116 can use policy rules to determine a next action that may prevent failure of attempted communication sessions.

For example, when the P-CSCF 116 sends an AAR 418A to the primary PCF 112 but a Gx binding unavailable error 420 occurs, the P-CSCF 116 can send an AAR 418B to the backup PCF 114 over an Rx interface based on policy rules. For example, the P-CSCF 116 can have previously established peer Rx sessions with multiple PCFs, including the primary PCF 112 and backup PCF 114. Accordingly, when a Gx binding unavailable error 420 occurs with respect to a primary PCF 112, the P-CSCF's policy rules can indicate that the P-CSCF 116 should use a peer Rx session that has already been established with a backup PCF 114 to send the AAR 418 to the backup PCF 114.

When the backup PCF 114 does have Gx binding information about the UE 102 as discussed above, the backup PCF 114 can return an Authorize/Authenticate Answer (AAA) 422 to the P-CSCF 116 over the peer Rx session to confirm that the Gx binding information has been found. The backup PCF 114 can also perform any actions requested by the P-CSCF 116 in the AAR 418 once it has found the Gx binding information and identified an existing Gx session with a gateway 108 for the UE 102. For example, the backup PCF 114 can provide new or modified PCC rules for a VoLTE call or any other type of communication session.

Accordingly, although the primary PCF 112 would have been unable to find Gx binding information for a UE 102 in response to an AAR 418, for example because it was offline or a Gx session for the UE 102 was never established with the primary PCF 112, the UE's communication session can still be set up or modified by the backup PCF 114 as requested by the P-CSCF 116 despite the occurrence of the Gx binding unavailable error 420.

As described above, in conventional systems setup of communication session for a UE 102 may fail entirely due to a Gx session error 408 and/or a Gx binding unavailable error 420. Accordingly, in such conventional systems a UE 102 would either need to retry the failed communication session in the same way or attempt circuit-switched fallback procedures. Both of these actions in conventional systems may introduce delay, or fail themselves. However, such delays and communication session setup failures can be prevented as described herein by having a gateway 108 contact a backup PCF 114 upon a Gx session error 408 and by having a P-CSCF 116 contact the backup PCF 114 upon a Gx binding unavailable error 420.

Example Architecture

Figure 5:
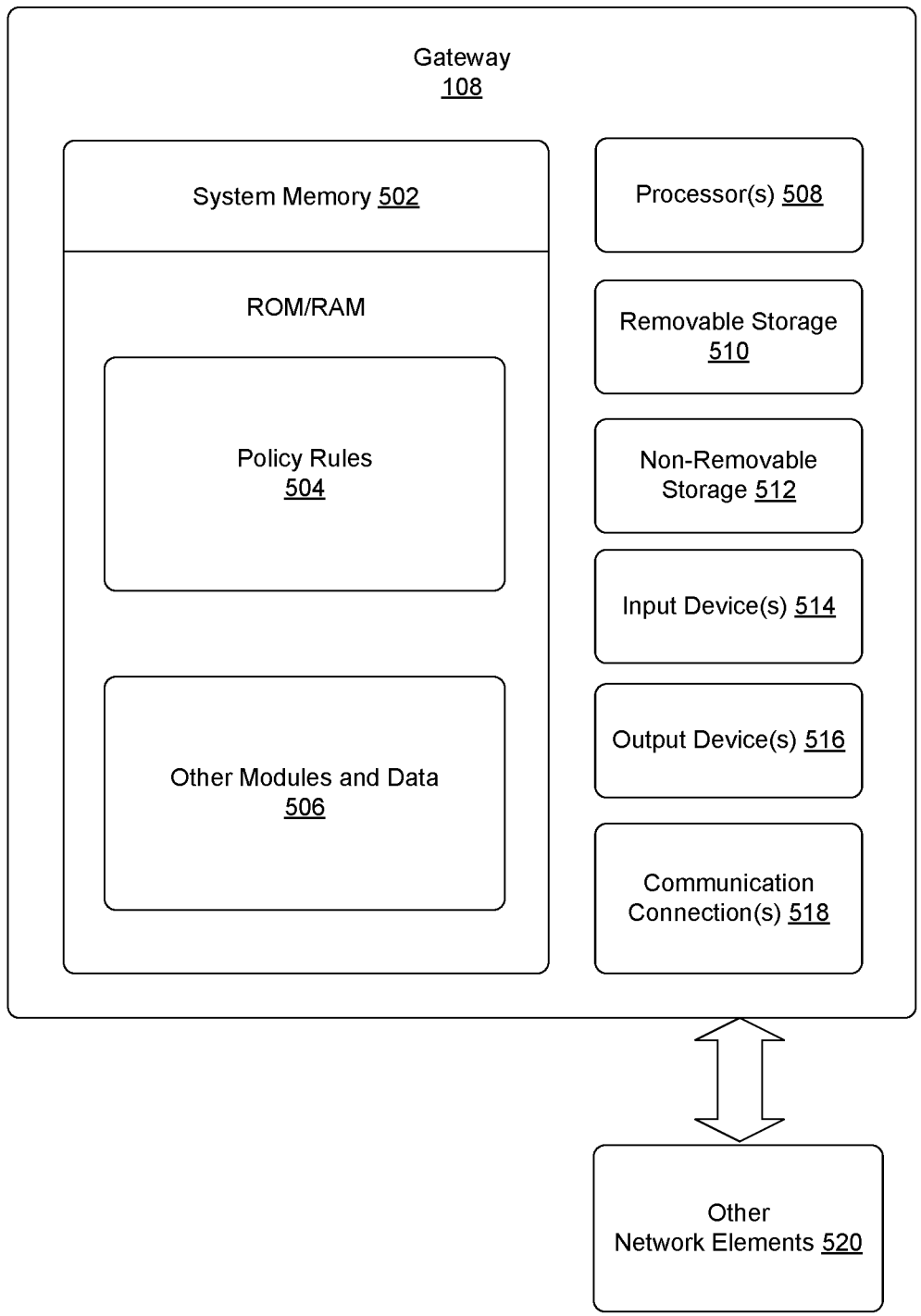
FIG. 5 depicts an example system architecture of a gateway.

FIG. 5 depicts an example system architecture of a gateway 108. As described above, the gateway 108 can be an LTE P-GW 204, a 5G UPF 304, or any other type of gateway 108 that can connect a core network to a primary PCF 112 and/or a backup PCF 114 via Diameter Gx interfaces.

The gateway 108 can be, or run on, a computing device that has a system memory 502. The system memory 502 can store data for the gateway 108, including policy rules 504 and/or other modules and data 506. The computing device of the gateway 108 can also include processor(s) 508, removable storage 510, non-removable storage 512, input device(s) 514, output device(s) 516, and/or communication connections 518 for communicating with other network elements 520.

In various examples, system memory 502 can be volatile (such as RAM), non-volatile (such as ROM, flash memory, etc.), or some combination of the two. Example system memory 502 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The gateway's policy rules 504 can indicate when the gateway 108 should send a CCR 406 to a backup PCF 114 instead of a primary PCF 112. For example, the gateway 108 can track statistics associated with Gx session errors 408, such as a failure rate or failure count, and the policy rules 504 can indicate that the gateway 108 should send a CCR 406 to a backup PCF 114 instead of a primary PCF 112 when a Gx session error 408 occurs and the statistics meet a threshold value. The policy rules 504 can thus make the gateway 108 network-aware and let the telecommunication network self-heal when Gx session errors 408 occur. For example, the gateway 108 can recognize when a Gx session has not been established with a primary PCF 112, which may lead to setup of a communication session failing, and instead take alternative action to contact a backup PCF 114 via a Gx session. In some examples, the policy rules 504 can identify which PCFs are considered the primary PCF 112 and the backup PCF 114 for the gateway 108.

The other modules and data 506 can be utilized by the gateway 108 to perform or enable performing any action taken by the gateway 108. The other modules and data 506 can include a platform and applications, and data utilized by the platform and applications.

In some examples, the processor(s) 508 can be a central processing unit (CPU), a graphics processing unit (GPU), both CPU and GPU, or other processing unit or component known in the art.

The computing device of the gateway 108 can also include additional data storage devices (removable and/or non-removable) such as, for example, magnetic disks, optical disks, or tape. Such additional storage is illustrated in FIG. 5 by removable storage 510 and non-removable storage 512. Computer storage media may include volatile and nonvolatile, removable and non-removable media implemented in any method or technology for storage of information, such as computer readable instructions, data structures, program modules, or other data. System memory 502, removable storage 510 and non-removable storage 512 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the gateway 108. Any such computer-readable storage media can be part of the gateway 108. In various examples, any or all of system memory 502, removable storage 510, and non-removable storage 512, store programming instructions which, when executed, implement some or all of the herein-described operations of the gateway 108.

In some examples, the computing device of the gateway 108 can also have input device(s) 514, such as a keyboard, a mouse, a touch-sensitive display, voice input device, etc., and/or output device(s) 516 such as a display, speakers, a printer, etc. These devices are well known in the art and need not be discussed at length here.

The computing device of the gateway 108 can also contain communication connections 518 that allow the gateway 108 to communicate with other network elements 520 such as UEs 102, base stations 104, other gateways 108, other elements of the core network, elements of the IMS 110, primary PCFs 112, backup PCFs 114, and/or any other elements of the telecommunication network. For example, the communication connections 518 can be associated with Diameter Gx interfaces that allow Gx sessions to be established between the gateway 108 and a primary PCF 112 or a backup PCF 114.

Figure 6:
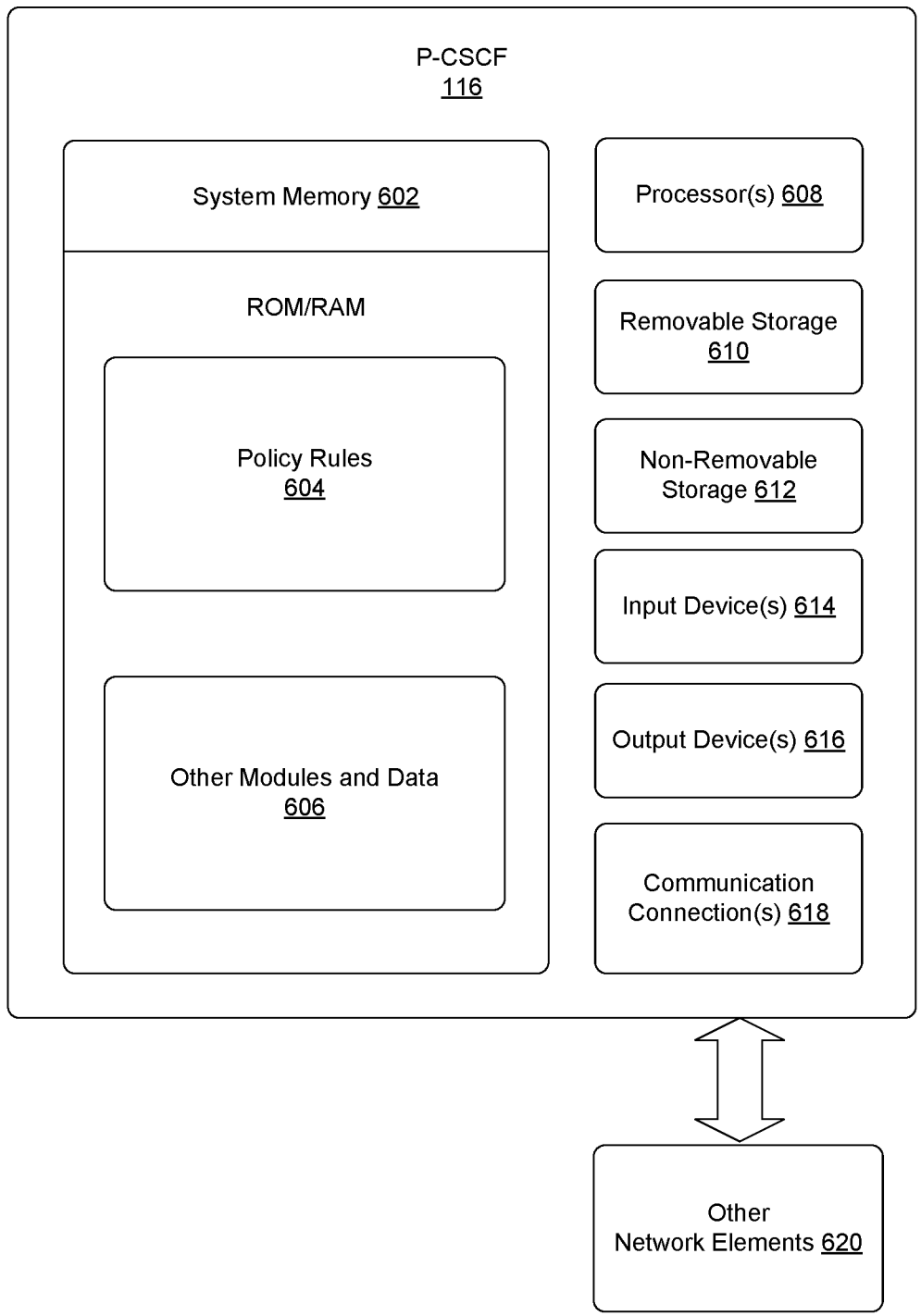
FIG. 6 depicts an example system architecture of a P-CSCF of an IMS.

FIG. 6 depicts an example system architecture of a P-CSCF 116 of an IMS 110. In some examples, other application functions of an IMS 110 that can connect to a primary PCF 112 and/or a backup PCF 114 via Diameter Rx interfaces can also have the example system architecture shown in FIG. 6.

The P-CSCF 116 can be, or run on, a computing device that has a system memory 602. The system memory 602 can store data for the P-CSCF 116, including policy rules 604 and/or other modules and data 606. The computing device of the P-CSCF 116 can also include processor(s) 608, removable storage 610, non-removable storage 612, input device (s) 614, output device(s) 616, and/or communication connections 618 for communicating with other network elements 620.

In various examples, system memory 602 can be volatile (such as RAM), non-volatile (such as ROM, flash memory, etc.), or some combination of the two. Example system memory 602 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The P-CSCF's policy rules 604 can indicate when the P-CSCF 116 should send an AAR 418 to a backup PCF 114 instead of a primary PCF 112. For example, the policy rules 604 can indicate that the P-CSCF 116 should send an AAR 418 to a backup PCF 114 instead of a primary PCF 112 when a Gx binding unavailable error 420 occurs. The policy rules 604 can thus make the P-CSCF 116 network-aware, such that the P-CSCF 116 can recognize when a Gx binding unavailable error 420 would cause setup of a communication session to fail, and instead take alternative action to set up the communication session via a peer Rx session with the backup PCF 114. In some examples, the policy rules 604 can identify which PCFs are considered the primary PCF 112 and the backup PCF 114 for the P-CSCF 116.

The other modules and data 606 can be utilized by the P-CSCF 116 to perform or enable performing any action taken by the P-CSCF 116. The other modules and data 606 can include a platform and applications, and data utilized by the platform and applications.

In some examples, the processor(s) 608 can be a central processing unit (CPU), a graphics processing unit (GPU), both CPU and GPU, or other processing unit or component known in the art.

The computing device of the P-CSCF 116 can also include additional data storage devices (removable and/or non-removable) such as, for example, magnetic disks, optical disks, or tape. Such additional storage is illustrated in FIG. 6 by removable storage 610 and non-removable storage 612. Computer storage media may include volatile and nonvolatile, removable and non-removable media implemented in any method or technology for storage of information, such as computer readable instructions, data structures, program modules, or other data. System memory 602, removable storage 610 and non-removable storage 612 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the P-CSCF 116. Any such computer-readable storage media can be part of the P-CSCF 116. In various examples, any or all of system memory 602, removable storage 610, and non-removable storage 612, store programming instructions which, when executed, implement some or all of the herein-described operations of the P-CSCF 116.

In some examples, the computing device of the P-CSCF 116 can also have input device(s) 614, such as a keyboard, a mouse, a touch-sensitive display, voice input device, etc., and/or output device(s) 616 such as a display, speakers, a printer, etc. These devices are well known in the art and need not be discussed at length here.

The computing device of the P-CSCF 116 can also contain communication connections 618 that allow the P-CSCF 116 to communicate with other network elements 620 such as UEs 102 via elements of the core network, other elements of the IMS 110, primary PCFs 112, backup PCFs 114, and/or any other elements of the telecommunication network. For example, the communication connections 618 can be used to send or receive SIP messages or be associated with Diameter Rx interfaces that allow peer Rx sessions to be established between the P-CSCF 116 and a primary PCF 112 and/or a backup PCF 114.

Figure 7:
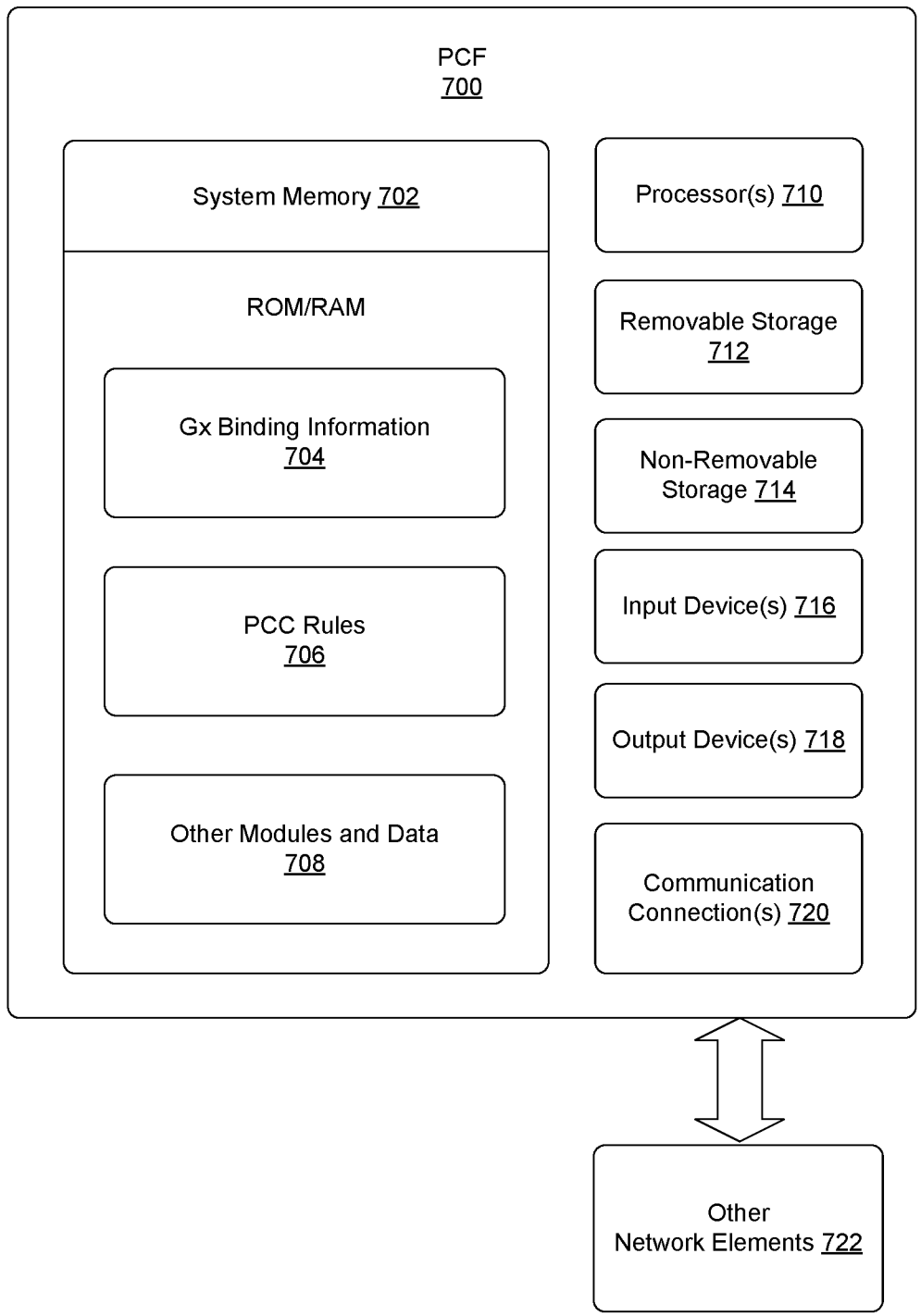
FIG. 7 depicts an example system architecture of a Policy Control Function (PCF).

FIG. 7 depicts an example system architecture of a PCF 700. The PCF 700 can be either a primary PCF 112 or a backup PCF 114. A PCF 700 can be an LTE PCRF 206, a 5G PCF 208, or any other type of PCF 700 that can connect to gateways 108 via Diameter Gx interfaces and to P-CSCFs 116 or other IMS application functions via Diameter Rx interfaces.

The PCF 700 can be, or run on, a computing device that has a system memory 702. The system memory 702 can store data for the PCF 700, including Gx binding information 704, PCC rules 706, and/or other modules and data 708. The computing device of the PCF 700 can also include processor(s) 710, removable storage 712, non-removable storage 714, input device(s) 716, output device(s) 718, and/or communication connections 720 for communicating with other network elements 722.

In various examples, system memory 702 can be volatile (such as RAM), non-volatile (such as ROM, flash memory, etc.), or some combination of the two. Example system memory 702 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The PCF's Gx binding information 704 can include information about Gx sessions that have been set up for UEs 102 between the PCF 700 and gateways 108. When the PCF 700 receives an AAR 418 from a P-CSCF 116 or an AF of the IMS 110 about a communication session for a UE, the PCF 700 can use the Gx binding information 704 to identify a previously established Gx session with a gateway 108 for that UE 102. The PCF 700 can then use the previously established Gx session to provide the gateway 108 with PCC rules 706 applicable to the communication session.

The PCF's PCC rules can be rules that can be applied to communication sessions for UEs 102 by gateways 108 or other network elements. The PCC rules may correspond to attributes of communication session types, service types, subscriber or account types, a Quality of Service (QoS) level, and/or any other attribute. For example, PCC rules can specify that data packets of a communication session should be given a certain priority level, be transmitted at least at a minimum bitrate, be transmitted on certain bearers, and/or be treated in any other specified way. In some examples, PCC rules can also define how a customer account is to be charged based on how data packets are transmitted or treated during a communication session.

The other modules and data 708 can be utilized by the PCF 700 to perform or enable performing any action taken by the PCF 700. The other modules and data 708 can include a platform and applications, and data utilized by the platform and applications.

In some examples, the processor(s) 710 can be a central processing unit (CPU), a graphics processing unit (GPU), both CPU and GPU, or other processing unit or component known in the art.

The computing device of the PCF 700 can also include additional data storage devices (removable and/or non-removable) such as, for example, magnetic disks, optical disks, or tape. Such additional storage is illustrated in FIG. 7 by removable storage 712 and non-removable storage 714. Computer storage media may include volatile and nonvolatile, removable and non-removable media implemented in any method or technology for storage of information, such as computer readable instructions, data structures, program modules, or other data. System memory 702, removable storage 712 and non-removable storage 714 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the PCF 700. Any such computer-readable storage media can be part of the PCF 700. In various examples, any or all of system memory 702, removable storage 712, and non-removable storage 714, store programming instructions which, when executed, implement some or all of the herein-described operations of the PCF 700.

In some examples, the computing device of the PCF 700 can also have input device(s) 716, such as a keyboard, a mouse, a touch-sensitive display, voice input device, etc., and/or output device(s) 718 such as a display, speakers, a printer, etc. These devices are well known in the art and need not be discussed at length here.

The computing device of the PCF 700 can also contain communication connections 720 that allow the PCF 700 to communicate with other network elements 722 such as gateways 108 or elements of the IMS 110. For example, the communication connections 720 can be associated with Diameter Gx interfaces that allow Gx sessions to be established between the PCF 700 and gateways 108, as well as Diameter Rx interfaces that allow Rx sessions to be established between the PCF 700 and P-CSCFs 116 or other IMS application functions.

Example Operations

Figure 8:
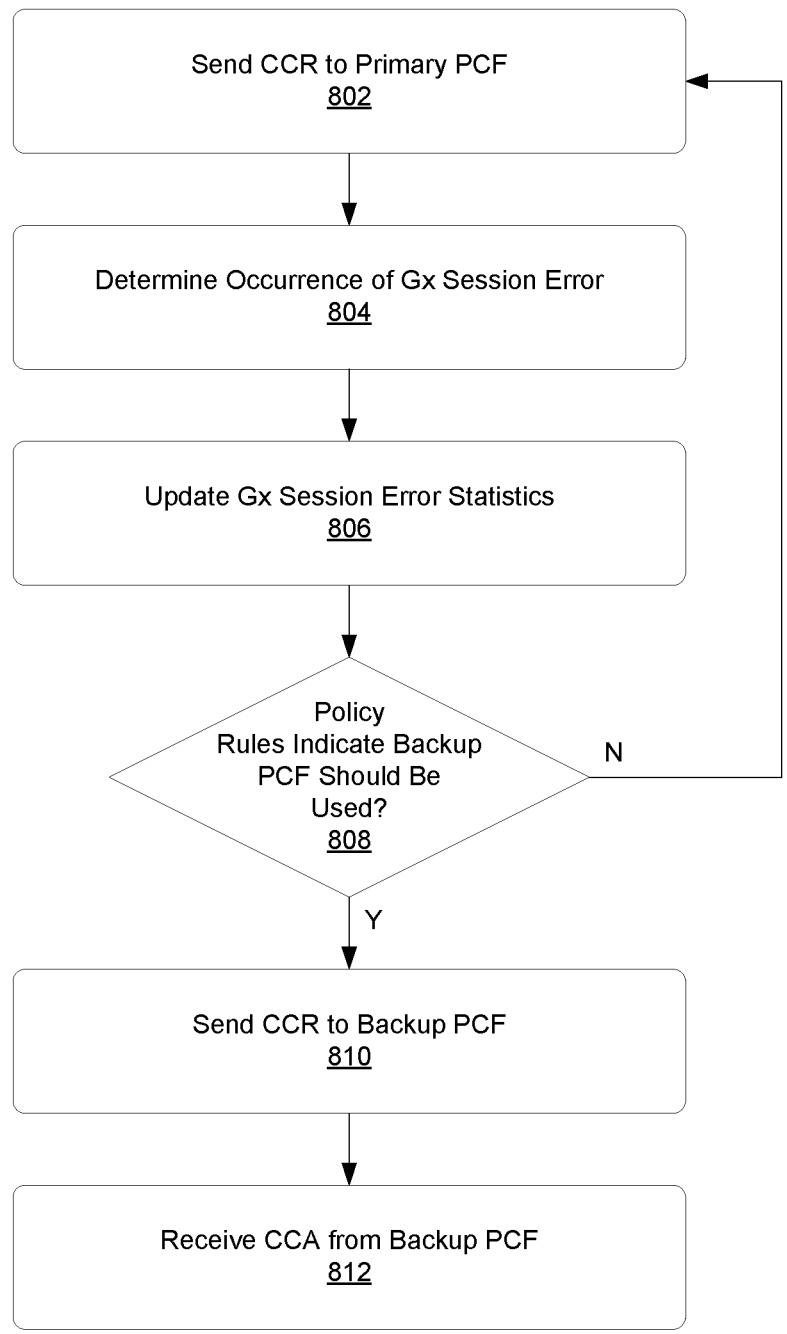
FIG. 8 depicts a process by which a gateway can prevent a failed communication session by establishing a Gx session with a backup PCF of a different network generation than the gateway.

FIG. 8 depicts a process by which a gateway 108 can prevent a failed communication session by establishing a Gx session with a backup PCF 114 of a different network generation than the gateway 108.

At block 802, the gateway 108 can attempt to send a CCR 406 to a primary PCF 112 over a Gx interface. In some examples, the gateway 108 may have received a create session request 404 from a management element 106 as part of a network attach process for a UE 102, and the gateway 108 can respond by attempting to send the CCR 406 to the primary PCF 112. In some examples, the primary PCF 112 and the gateway 108 can be associated with the same network generation.

At block 804, the gateway 108 can determine that a Gx session error 408 has occurred. In some examples, if the primary PCF 112 does not respond to the gateway's CCR 406 within a predetermined period of time, the gateway 108 can determine based on the lack of a response that a Gx session error 408 has occurred. In other examples, the primary PCF 112 can return an error message or other response indicating that the primary PCF 112 cannot handle the CCR 406, and the gateway 108 can determine that a Gx session error 408 has occurred based on the primary PCF's response.

At block 806, the gateway 108 can update Gx session error statistics associated with the primary PCF 112 based on the occurrence of the Gx session error 408. For example, over a period of time the gateway 108 can track a failure rate indicating how frequently Gx session errors 408 occur relative to CCRs 406 that have been sent to a primary PCF 112, or maintain a count of a number of times Gx session errors 408 have occurred with respect to the primary PCF 112.

At block 808, the gateway 108 can use policy rules to determine if a backup PCF 114 should be used. For example, if Gx session error statistics indicate that a failure rate associated with CCRs 406 sent to the primary PCF 112 is below a threshold value, the policy rules may indicate that the gateway 108 should return to block 802 and re-try sending the CCR 406 to the primary PCF 112. However, if Gx session error statistics indicate that the failure rate associated with CCRs 406 sent to the primary PCF 112 is at or above a threshold value, the policy rules may indicate that the gateway 108 should instead send the CCR 406 to a backup PCF 114 associated with a different network generation than the gateway 108. In some examples, block 806 can be absent, and the policy rules may indicate at block 808 that a CCR 406 should be immediately sent to a backup PCF 114 when a single Gx session error 408 occurs in association with a CCR 406 sent to the primary PCF 112 at blocks 802 and 804.

At block 810, the gateway 108 can send the CCR 406 to the backup PCF 114 over a Gx interface. For examples, the gateway 108 can send the CCR 406 to the backup PCF 114 by establishing and using a new Gx session with the backup PCF 114, or by using a passive Gx session that was previously established with the backup PCF 114. In some examples, the backup PCF 114 can be associated with a different network generation than the gateway 108 and the primary PCF 112, such that issues preventing establishment of a Gx session with the primary PCF 112 may be less likely to impact a Gx session with the different-generation backup PCF 114.

At block 812, the gateway 108 can receive a CCA 410 over the Gx interface from the backup PCF 114. The CCA 410 can indicate that a Gx session binding has been established between the gateway 108 and the backup PCF 114 with respect to the UE 102, such that the backup PCF 114 can later use the Gx binding information to identify the gateway 108 and the Gx session associated with the UE 102. In some examples, the gateway 108 can respond to the CCA 410 by sending a create session response 412 back to the management element 106, such that the network attach process for the UE 102 can be completed.

Figure 9:
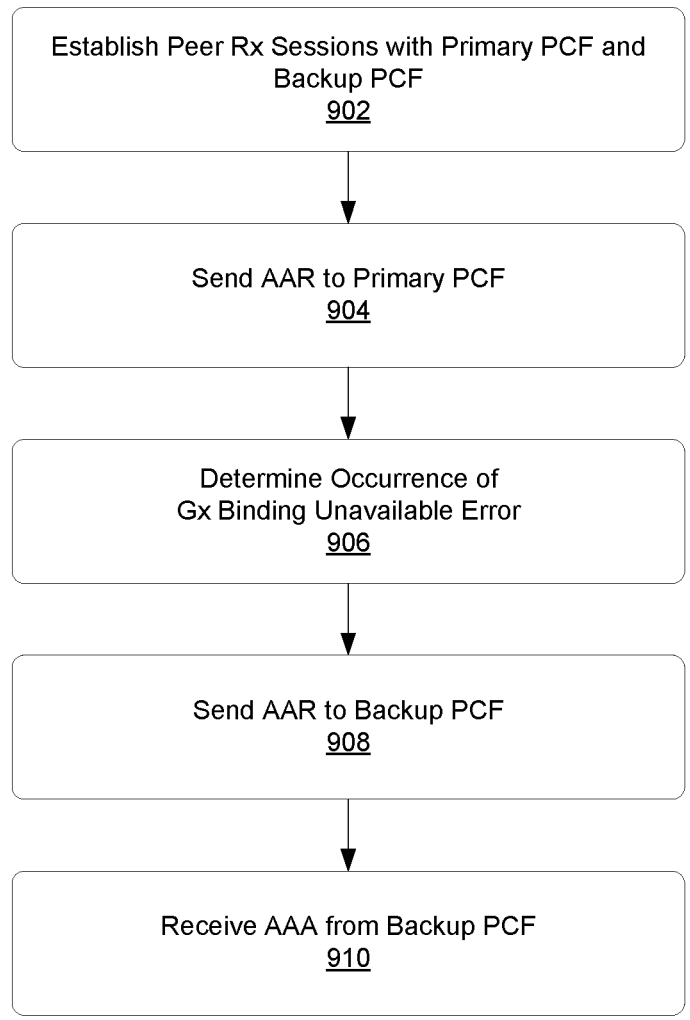
FIG. 9 depicts a process by which a P-CSCF can prevent a failed communication session by contacting a backup PCF when a primary PCF cannot provide PCC rules for the communication session to a gateway.

FIG. 9 depicts a process by which a P-CSCF 116 can prevent a failed communication session by contacting a backup PCF 114 when a primary PCF 112 cannot provide PCC rules for the communication session to a gateway 108.

At block 902, the P-CSCF 116 can establish peer Rx sessions with a primary PCF 112 and a backup PCF 114. While in some examples, the P-CSCF 116 can identify which peer Rx sessions are associated with the primary PCF 112 and the backup PCF 114, in other examples the P-CSCF 116 can establish peer Rx sessions with PCFs of different network generations such that either generation of PCF can serve as a primary PCF 112 or a backup PCF 114 depending on the situation.

At block 904, the P-CSCF 116 can attempt to send an AAR 418 to a primary PCF 112 over an Rx session. In some examples, the P-CSCF 116 may have received a SIP message from a UE 102 regarding a new communication session, and the P-CSCF 116 can respond by attempting to send the AAR 418 to a primary PCF 112. The AAR 418 can request that PCC rules associated with the new communication session be sent to a gateway 108 associated with the UE 102.

As noted above, in some examples the P-CSCF 116 may have pre-identified which of the PCFs it has established peer Rx sessions with is the primary PCF 112 and which is the backup PCF 114. For example, if the P-CSCF 116 is specifically associated with LTE services, then the P-CSCF 116 can identify an LTE PCRF 206 as the primary PCF 112 and a 5G PCF 208 as the backup PCF 114, and send the AAR 418 to the LTE PCRF 206 at block 904. In other examples, the P-CSCF 116 may determine which of the PCFs it has established peer Rx sessions with is the primary PCF 112 and which is the backup PCF 114 from the type of the communication session requested in the SIP message. For example, if the P-CSCF 116 is configured to manage services associated with different network generations but the SIP message is specifically associated with a VoLTE call, the P-CSCF 116 can determine that the LTE PCRF 206 is the primary PCF 112 and send the AAR 418 to the LTE PCRF 206 at block 904.

At block 906, the P-CSCF 116 can determine that a Gx binding unavailable error 420 has occurred. In some examples, if the primary PCF 112 does not respond to the P-CSCF's AAR 418 within a predetermined period of time, the P-CSCF 116 can determine based on the lack of a response that a Gx binding unavailable error 420 has occurred. In other examples, the primary PCF 112 can return a Diameter 5065 "IP-CAN_SESSION_NOT_AVAILABLE" message or other explicit message indicating that the primary PCF 112 cannot locate Gx binding information associated with the UE 102 or otherwise cannot process the AAR 418.

At block 908, the P-CSCF 116 can send the AAR 418 to the backup PCF 114 over the previously established peer Rx interface. As noted above, in some examples the backup PCF 114 can be associated with a different network generation than the primary PCF 112, such that issues preventing establishment of a Gx session between a gateway 108 and a primary PCF 112 may have been less likely to impact establishment of a Gx session between the gateway 108 and the different-generation backup PCF 114. Accordingly, in situations in which the primary PCF 112 was offline or was inaccessible to the gateway 108 over a Gx interface, the gateway 108 can have established a Gx session for the UE 102 with the backup PCF 114 instead. Accordingly, the backup PCF 114 can have Gx binding information about the Gx session with the gateway 108 for the UE 102.

At block 910, the P-CSCF 116 can receive an AAA 422 from the backup PCF 114 over the peer Rx interface. The AAA 422 can confirm that the backup PCF 114 found Gx binding information for the UE 102 and will perform any actions requested by the P-CSCF 116 in the AAR 418, such as providing the gateway 108 with new or modified PCC rules for the communication session requested in the SIP message.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
sending, by a gateway of a telecommunication network, a Credit Control Request (CCR) associated with a user equipment (UE) to a primary Policy Control Function (PCF) over a first Gx interface;
detecting, by the gateway, a Gx session error associated with the primary PCF indicating that a Gx session has not been established between the gateway and the primary PCF;
in response to detecting the Gx session error, identifying, by the gateway, a backup PCF associated with a different network generation than the primary PCF;
sending, by the gateway, the CCR to the backup PCF over a second Gx interface; and
receiving, by the gateway, a Credit Control Answer (CCA) from the backup PCF over the second Gx interface confirming that Gx session binding has been established for the UE between the gateway and the backup PCF,
wherein:
the gateway is a Long Term Evolution (LTE) Packet Data Network Gateway (P-GW), the primary PCF is an LTE Policy and Charging Rules Function (PCRF), and the backup PCF is a 5G PCF, or the gateway is a 5G User Plane Function (UPF), the primary PCF is a 5G PCF, and the backup PCF is a LTE PCRF.

2. The method of claim 1, further comprising receiving, by the gateway, Policy and Charging Control (PCC) rules from the backup PCF via the second Gx interface, the PCC rules being applicable to a communication session requested by the UE.

3. The method of claim 1, wherein detecting the Gx session error associated with the primary PCF comprises tracking a rate of CCRs sent to the primary PCF that did not result in Gx sessions being established between the gateway and the primary PCF, and wherein the gateway identifies the backup PCF in response to detecting the Gx session error when the rate exceeds a threshold rate.

4. The method of claim 1, wherein detecting the Gx session error associated with the primary PCF comprises determining that a timeout error has occurred when the primary PCF does not respond to the CCR within a predetermined period of time.

5. The method of claim 1, further comprising:

receiving, by a IP Multimedia Subsystem (IMS) element, a message from the UE requesting initiation of a communication session for the UE;

sending, by the IMS element, an Authorize/Authenticate Request (AAR) associated with the communication session for the UE to the primary PCF over a first peer Rx interface;

detecting, by the IMS element, a Gx binding unavailable error associated with the primary PCF;

sending, by the IMS element, the AAR to the backup PCF over a second peer Rx session; and receiving, by the IMS element, an Authorize/Authenticate Answer (AAA) from the backup PCF over the second peer Rx session confirming that the backup PCF identified Gx binding information associated with the Gx session binding.

6. The method of claim 5, wherein detecting the Gx binding unavailable error associated with the primary PCF comprises receiving, by the IMS element, a Diameter message over the first peer Rx session indicating that the primary PCF could not find Gx binding information associated with the UE.

7. A gateway of a telecommunication network, comprising:

one or more processors; and memory storing computer-executable instructions that, when executed by the one or more processors, cause the gateway to:

send a Credit Control Request (CCR) associated with a user equipment (UE) to a primary Policy Control Function (PCF) over a first Gx interface;

detect a Gx session error associated with the primary PCF indicating that a Gx session has not been established between the gateway and the primary PCF;

in response to detection of the Gx session error, identify a backup PCF associated with a different network generation than the primary PCF;

send the CCR to the backup PCF over a second Gx interface; and receive a Credit Control Answer (CCA) from the backup PCF over the second Gx interface confirming that Gx session binding has been established for the UE between the gateway and the backup PCF, wherein:

the gateway is a Long Term Evolution (LTE) Packet Data Network Gateway (P-GW), the primary PCF is an LTE Policy and Charging Rules Function (PCRF), and the backup PCF is a 5G PCF, or the gateway is a 5G User Plane Function (UPF), the primary PCF is a 5G PCF, and the backup PCF is a LTE PCRF.

8. The gateway of claim 7, wherein the computer-executable instructions further cause the gateway to receive Policy and Charging Control (PCC) rules from the backup PCF via the second Gx interface, the PCC rules being applicable to a communication session requested by the UE.

9. The gateway of claim 7, wherein detection of the Gx session error associated with the primary PCF comprises tracking a rate of CCRs sent to the primary PCF that did not result in Gx sessions being established between the gateway and the primary PCF, and wherein the gateway identifies the backup PCF in response to detecting the Gx session error when the rate exceeds a threshold rate.

10. The gateway of claim 7, wherein detection of the Gx session error associated with the primary PCF comprises determining that a timeout error has occurred when the primary PCF does not respond to the CCR within a predetermined period of time.

11. One or more non-transitory computer-readable media storing computer-executable instructions that, when executed by one or more processors of a gateway of a telecommunication network, cause the gateway to perform operations comprising:

sending a Credit Control Request (CCR) associated with a user equipment (UE) to a primary Policy Control Function (PCF) over a first Gx interface;

detecting a Gx session error associated with the primary PCF indicating that a Gx session has not been established between the gateway and the primary PCF;

in response to detecting the Gx session error, identifying a backup PCF associated with a different network generation than the primary PCF;

sending the CCR to the backup PCF over a second Gx interface; and receiving a Credit Control Answer (CCA) from the backup PCF over the second Gx interface confirming that Gx session binding has been established for the UE between the gateway and the backup PCF, wherein:

the gateway is a Long Term Evolution (LTE) Packet Data Network Gateway (P-GW), the primary PCF is an LTE Policy and Charging Rules Function (PCRF), and the backup PCF is a 5G PCF, or the gateway is a 5G User Plane Function (UPF), the primary PCF is a 5G PCF, and the backup PCF is a LTE PCRF.

12. The one or more non-transitory computer-readable media of claim 11, wherein the operations further comprise receiving Policy and Charging Control (PCC) rules from the backup PCF via the second Gx interface, the PCC rules being applicable to a communication session requested by the UE.

13. The one or more non-transitory computer-readable media of claim 11, wherein detecting the Gx session error associated with the primary PCF comprises tracking a rate of CCRs sent to the primary PCF that did not result in Gx sessions being established between the gateway and the primary PCF, and wherein the gateway identifies the backup PCF in response to detecting the Gx session error when the rate exceeds a threshold rate.

14. The one or more non-transitory computer-readable media of claim 11, wherein detecting the Gx session error associated with the primary PCF comprises determining that a timeout error has occurred when the primary PCF does not respond to the CCR within a predetermined period of time.

* * * * *